United States Patent Office 2,816,113
Patented Dec. 10, 1957

2,816,113

ALKYL PYRIDINIUM SALT, 2-CARBOXALDE-HYDE OXIMES AND PROCESS OF PREPARATION

Irwin B. Wilson, Fair Lawn, N. J., and Sara Ginsburg, and David Nachmansohn, New York, N. Y., assignors to the United States of America as represented by the Secretary of the Army No Drawing. Application July 10, 1956,
Serial No. 597,055

10 Claims. (Cl. 260—296)

The present invention provides new compositions of matter which have been found to have antidotal properties for the irreversible inhibitors of cholinesterase.

The chemical lesion in alkylphosphate intoxication is the inhibition of acetylcholinesterase, although in some cases there may also be a reaction with the acetylcholine receptor. Once this causal connection had been established it became important to understand the exact reaction mechanism between acetylcholinesterase and alkylphosphates. Studies based on the molecular forces acting between acetylcholine and the enzyme led to an understanding of the hydrolytic process. This analysis made it possible to elucidate the exact mechanism of the reaction between alkylphosphates and enzyme.

According to these studies, in the physiological action of acetylcholinesterase an acetyl enzyme is formed which then reacts with $H_2O$ to form acetate and enzyme. In the reactions with alkylphosphate a phosphorylated enzyme is formed which, however, does not react with $H_2O$; the phosphoryl group remains attached to the enzyme and the enzyme is inhibited. Since it is a vital enzyme for nerve function, death ensues.

The antidote has been developed on the premise that nucleophilic agents should be able to dephosphorylate the enzyme and thereby repair the chemical lesion. Hydroxylamine was found to reactivate the enzyme in vitro. However, the action is slow and the required concentration is high. Acetylcholinesterase shows a specificity toward quaternary nitrogen derivatives and it was reasoned, therefore, that the activity of a hydroxylamine derivative could be promoted by the incorporation in the molecule of a quaternary ammonium structure at a suitable atomic distance.

It has been established in practice that a new class of oximes containing a positively charged nitrogen atom of the general formula below have proved to be very effective as a specific antidote against lethal alkylphosphate intoxication:

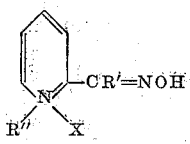

where R' represents H or alkyl and R" represents methyl or ethyl groups. These compounds are salts where the anionic part ($X^-$) is not critical and can be a halogenide, an organic sulfate, and so on. It has not yet been established whether this new class has the syn- or the anti-configuration.

Preparation of these compounds can be achieved using two general methods:

(a) By action of alkyl halides, sulfates, toluene sulfonates or other N-methylating agents on tertiary pyridine oximes, or, (b) By action of hydroxylamine on quaternary aldehydes and ketones.

Tertiary pyridine oximes can be prepared in the general way, either by reacting aldehydes or ketones with hydroxylamine at slight acid or alkaline pH or by action of nitrous acid or its esters on pyridine compounds containing active methylene groups, or by reaction between a pyridine nucleus and mercuric fulminate or by interaction of diazonium salts with formaldoxime or acetaldoxime. The subsequent alkylation can be done either at room or elevated temperatures with or without solvents.

The quaternary aldehydes are prepared by applying methylating agents to aldehydes or ketones or by preparing quaternary derivatives containing active methylene groups and reacting these with nitrous acid derivatives, e. g. p-nitroso-dimethyl aniline and subsequent saponification.

Reaction of these aldehydes or ketones with hydroxylamine is effected in aqueous or alcoholic solutions at temperatures between 0° and 100° C. and neutral or slightly acidic pH.

Prior to the present invention, the class of oximes containing a positively charged nitrogen atom of the general formula, as previously shown, was not known so that the novel process of the present invention includes the synthesis of these compounds.

The procedures are further illustrated by the following examples without being restricted thereto:

EXAMPLE I (2-PYRIDINE ALDOXIME METHIODIDE)

2-pyridine aldoxime 3.05 g., nitrobenzene 10 ml., and methyliodide 20 ml. were refluxed for 3 hours and left at room temperature overnight. This is mixed with 40 ml. acetone and filtered and rinsed with acetone. The yield is 88 percent of theory. Recrystallization from methanol produced bright yellow needles having a melting point of 224–225° C. It is very soluble in water, fairly soluble in hot alcohols, poorly soluble in cold alcohols and insoluble in ether and acetone.

EXAMPLE II (4-PYRIDINE ALDOXIME METHIODIDE)

4-pyridine aldoxime, 1.22 g., was dissolved in acetone 20 ml., and methyliodide, 20 ml., was added. The quaternary salt started to precipitate very shortly. After several hours it was filtered off and washed with acetone. The yield was 99 percent of theory, forming bright yellow crystals having a melting point of 181–183° C.

EXAMPLE III (METHYL-2-PYRIDYL KETOXIME METHIODIDE)

The quaternary ketone was prepared from methyl-2-pyridyl ketone with excess of methyliodide in acetone at room temperature producing faint yellow crystals having a melting point of 163–164° C. This ketone, 6.6 g., was reacted with aqueous solution of $NH_2OHHCl$, 2.6 g., neutralized with NaOH to pH 6–7. After testing for 15 minutes on steam bath the water was evaporated under reduced pressure and the almost dry residue extracted with hot absolute ethanol to eliminate mineral salts. On cooling the oxime crystallized. The overall yield was 45 percent, producing yellow needles having a melting point of 213–214°.

Certain phosphate esters such as tetraalkylpyrophosphates, dialkyl-p-nitrophenyl phosphates, and dialkyl fluorophosphates, are potent irreversible inhibitors of acetylcholinesterase and esterases in general. The reactivation of alkylphosphate-inhibited acetylcholinesterase is of both practical and theoretical importance. It is of practical interest because the most potent chemical warfare gases and some powerful insecticides are alkylphosphates and their lethal action is due to the inhibition of acetylcholinesterase. It is of theoretical interest because the mechanism of inhibition and of reactivation is very closely related to the mechanism of enzymic hydrolysis. This enzyme contains two sites, (i) an anionic site which contributes to the catalytic activity by binding and orienting molecules containing substituted ammonium structures, and (ii) an esteratic site which interacts with the ester function and is primarily responsible for the hydrolytic activity. During the hydrolysis of a carboxylic ester a basic group in the esteratic site is acylated to form an acyl-enzyme as intermediate. Acetyl-enzyme (from acetate-esters or anhydrides) rapidly reacts with water to produce acetic acid and to regenerate the free and active enzyme. The alkyl phosphate inhibitors react with the same basic group to form a dialkyl phosphoryl enzyme which however reacts only very slowly with water.

The inhibitory reaction is illustrated for a fluorophosphate:

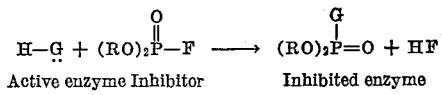

Active enzyme   Inhibitor   Inhibited enzyme where H—G represents the esteratic site containing an acidic group (H) and a basic group (..). Theory predicts that nucleophilic reagents should dephosphorylate the enzyme and thus restore its activity. When R=ethyl (inhibitor=diethyl fluorophosphate or tetraethyl pyrophosphate (TEPP)) reactivation is readily accomplished by a large number of suitable compounds. When R=isopropyl (inhibitor= diisopropyl fluorophosphate (DFP)) reactivation is more difficult.

Experiments show that the anionic site survives the inhibition of the enzyme and can contribute to the reactivation process. Therefore a very good reactivator might be produced by combining in the same molecule an intrinsically good functional group and a suitably located quaternary ammonium structure. These studies also show that the intrinsic activity could be augmented by a pyridine nucleus.

Therefore, 2-pyridine aldoxime methiodide was prepared in order to evaluate the effect of introducing a quaternary structure. It was found to be extremely active in reactivating the inhibited enzyme formed with two representative inhibitors, tetraethylpyrophosphate (TEPP) and diisopropyl fluorophosphate (DFP).

The results are presented in Table IA. From these results it appeared that measurements with TEPP might not be rate measurements but rather the extent of reactivation achieved at equilibrium of the reaction:

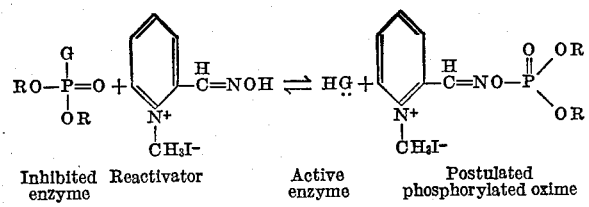

Inhibited  Reactivator   Active   Postulated
enzyme                   enzyme   phosphorylated oxime To test this possibility the inhibited enzyme was diluted 400 times (instead of 7.5 times) before the reactivator was added. Under these circumstances the postulated phosphorylated oxime should be greatly reduced and the equilibrium displaced to the right. The results so obtained, Table IB, are consistent with the assumption of equilibrium. High reactivations are obtained with very low reactivator concentrations. With TEPP even at these low concentrations it appears that the rate is much less than 1 minute and that the measurements constitute equilibrium values. The DFP data seem to indicate a rate, but the situation is not clear.

The quaternary oxime is a million times better than the non-methylated compounds and 50,000 times better than picolinohydroxamic acid in reactivating TEPP inhibited enzyme. The reactivation appears to be approaching enzyme speeds.

Table I.—*Percent reactivation of alkylphosphate-inhibited acetylcholinesterase with 2-pyridine aldoxime methiodide*

The reactivations were carried out as follows: 0.2 ml. of enzyme solution prepared from *Electrophorus electricus* was treated with 0.01 ml. of TEPP or DFP solution (20 γ/ml.), and diluted after 1 hour in the cold to 1.5 ml. This solution was used as stock for reactivation; to 0.2 ml. were added 0.2 ml. of reactivator solution of suitable concentration in 0.015 M phosphate buffer (pH 7) and 0.007 M EDTA. After suitable incubations (1', 5', 11') the reactivated solution was diluted to 50 ml. with water and 1 ml. was added to the manometric vessels for assay. The total enzyme dilution was 5625 fold. In part B the inhibited enzyme was diluted to 80.0 ml. instead of 1.5 ml.

A. DILUTED 7.5 TIMES

|  | TEPP | | DFP | |
|---|---|---|---|---|
|  | 1' | 5' | 1' | 5' |
| $5.10^{-3}$ M |  |  | 55 | 82 |
| $2.10^{-3}$ |  |  | 43 | 66 |
| $10^{-3}$ | 94 | 94 |  |  |
| $10^{-4}$ | 41 | 48 |  |  |
| $10^{-5}$ | 8 | 9.5 |  |  |

B. DILUTED 400 TIMES

|  | 1' | 5' | 1' | 11' |
|---|---|---|---|---|
| $10^{-4}$ |  |  | 38 | 53 |
| $10^{-5}$ | 85 | 89 | 9 | 12 |
| $10^{-6}$ | 25 | 29 |  |  |

Most reactivators react directly with TEPP and DFP. This is also the case with the quaternary oxime. The rate as judged by acid production was fairly rapid but not extraordinary; with 0.01 M oxime and 0.002 M phosphate anhydride the time for 50% reaction at 25° C. and pH 7.4 was 12 and 20 minutes for TEPP and DFP respectively.

The nicotino- and picolinohydroxamic acids proved already to be of value as antidote of the so-called "nerve gas" in animals. The quaternary oxime is thousands of times more potent as a reactivator. It appeared desirable, therefore, to investigate whether this compound was sufficiently nontoxic to be used as an antidote and whether, if so, it would in fact serve as an antidote for the irreversible inhibitors of cholinesterase. White mice weighing about 20 g. were used without regard to sex. The general procedure was to inject paraoxon subcutaneously followed 1–2 min. later by interperitoneal injection of 2-pyridine aldoxine methiodide (2-PAM). In some cases multiple injections of 2-PAM were used starting 1–2 min. before the paraoxon, repeated 5 or 10 min. after the poison and in some cases again 15 min. later. The doses of paraoxon designated as $LD_{50}$ and $LD_{100}$ correspond to acute poisoning; death occurs in 5–20 min.

The acute toxicity of 2-PAM is given in Table II. The toxicity of the compound, while important, is not especially great. Death which is due to respiratory failure occurs within 10–20 min.

On the basis of the minimal lethal dose it was decided to use as a maximum dose 75 mg. 2-PAM/kg. This was considered to be a safe dose. The antidotal properties of 2-PAM as seen from Table III are quite marked. Complete survival was obtained from a $LD_{100}$ dose of paraoxon with a safe dose of 2-PAM. Because of uncertainty concerning the time course of an effective antidote level, it was thought that better results might be obtained with very low antidote doses if they were given as multiple injections. As will be seen, three injections totaling only 11 mg./kg. save 7 out of 11 mice.

Table II.—*The toxicity of interperitoneal injections of 2-PAM*

DEATH OCCURS WITHIN 20 MIN.

| Lethality | Dose (mg./kg., I. P.) |
|---|---|
| minimal lethal dose | about 100. |
| $LD_{50}$ | 136±6. |
| $LD_{100}$ | 180–200. |

Table III.—*Antidotal properties of 2-PAM*

In the case of multiple injections of antidote the times are indicated in parenthesis. In other cases the antidote was added (I. P.) 1–2 min. after the poison (S. C.)

| Paraoxon dose (mg./kg.) | 2-PAM dose (mg./kg.) | dead | alive |
|---|---|---|---|
| $LD_{50}=0.68$ | 0 | 5 | 5 |
| $LD_{50}$ | 75 | 0 | 10 |
| $LD_{100}=0.90$ | 0 | 10 | 0 |
| $LD_{100}$ | 75 | 0 | 10 |
| $LD_{100}$ | 25 | 5 | 20 |
| $LD_{100}$ | 7.5 | 10 | 0 |
| $LD_{100}$ | 3.7(−1−2) 3.7(+10) | [1]5 | 4 |
| $LD_{100}$ | 3.7+3.7+3.7 (−1−2) (+5) (+15) | [2]4 | 7 |

[1] One mouse of these five died before the second injection could be given.
[2] Two mice of these four died before the third injection could be given.

Many inhibitors of cholinesterase produce the same phosphoryl enzyme as paraoxon. However, this is not enough to insure that a quaternary oxime will be an effective antidote for all these compounds because it is also necessary that the quaternary oxime be able to penetrate to the same vital nervous centers as the poison. One cannot predict, therefore, with certainty that the quaternary oxime will be an effective antidote for all poisons of this class, but it does appear likely that it will serve for a good number of them. Since 2-PAM is a much poorer reactivator of the serum esterase, in vitro, it may be concluded that probably only acetylcholinesterase has been reactivated in these in vivo experiments.

It will be understood from the foregoing description that, while it presents in detail the preferred procedural steps in sequential detail, it will be apparent that the invention is intended to embrace within its scope such equivalent procedures as may become suggested to one skilled in the art as being operational under ambient or procedural conditions at variance with the specifically described conditions in various ways; and accordingly, it will be understood that it is intended and desired to embrace within the scope of this invention such modifications and changes as may be necessary or desirable to adapt it to varying conditions and uses, as defined in the appended claims.

Having thus described our invention, what we claim as new and wish to secure by Letters Patent is:

1. As a new composition of matter, a new class of oximes of the general formula

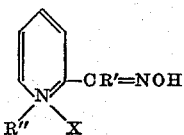

wherein R' is a member selected from the group consisting of H and lower alkyl and R'' is a radical selected from the group consisting of methyl and ethyl groups and X represents the anionic part of the R''X salt.

2. As a new composition of matter, 2-pyridine aldoxime methiodide.

3. As a new composition of matter, 4-pyridine aldoxime methiodide.

4. As a new composition of matter, methyl-2-pyridyl ketoxime methiodide.

5. A process for producing 2-pyridine aldoxime methiodide, comprising alkylating 2-pyridine aldoxime with methyliodide.

6. A process for producing 4-pyridine aldoxime methiodide, comprising alkylating 4-pyridine aldoxime with methyliodide.

7. A process for producing a new class of oximes of the general formula

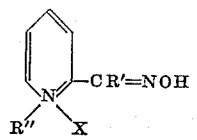

wherein R' is a member selected from the group consisting of H and lower alkyl and R'' is a radical selected from the group consisting of methyl and ethyl groups and X represents the anionic part of the R''X salt, which comprises alkylation of tertiary pyridine oximes with N-methylating agents.

8. A process for producing a new class of oximes of the general formula

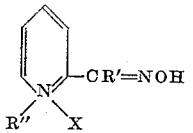

wherein R' is a member selected from the group consisting of H and lower alkyl and R'' is a radical selected from the group consisting of methyl and ethyl groups and X represents the anionic part of the R''X salt, which comprises reacting a quaternary pyridine ketone with hydroxylamine.

9. The process claimed in claim 8 wherein the quaternary pyridine ketone is prepared from methyl-2-pyridyl ketone with excess of methyliodide in acetone at room temperature, said quaternary pyridine ketone reacted with hydroxylamine hydrochloride neutralized with sodium hydroxide to pH 6–7 to form methyl-2-pyridyl ketoxime methiodide.

10. A process for producing a new class of oximes of the general formula

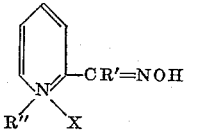

wherein R' is a member selected from the group consisting of H and lower alkyl and R'' is a radical selected from the group consisting of methyl and ethyl groups and X represents the anionic part of the R''X salt, which comprises reacting a quaternary pyridine aldehyde with hydroxylamine.

No references cited.